No. 640,779. Patented Jan. 9, 1900.
A. L. & A. W. LAWTON.
METHOD OF AND APPARATUS FOR PRESERVING BY GASES.
(Application filed Dec. 22, 1898.)
(No Model.)
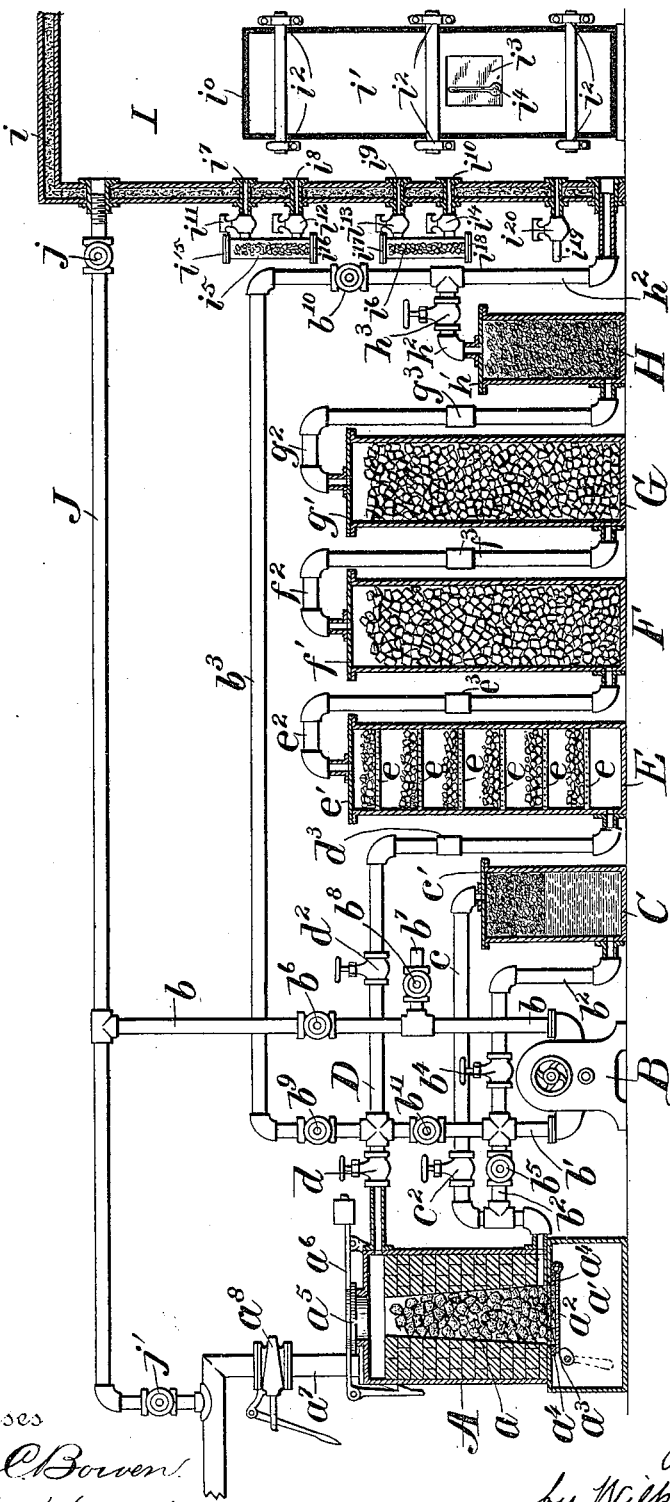
Witnesses
Percy C. Bowen
Jas. N. Holt
Inventors
A. L. Lawton
A. W. Lawton
by Wilkinson & Fisher
Attorneys

UNITED STATES PATENT OFFICE.

ALBERT L. LAWTON AND ARTHUR W. LAWTON, OF NEW YORK, N. Y.

METHOD OF AND APPARATUS FOR PRESERVING BY GASES.

SPECIFICATION forming part of Letters Patent No. 640,779, dated January 9, 1900.

Application filed December 22, 1898. Serial No. 700,004. (No model.)

*To all whom it may concern:*

Be it known that we, ALBERT L. LAWTON and ARTHUR W. LAWTON, citizens of the United States, residing at New York, in the county of New York and State of New York, have invented certain new and useful Improvements in Methods of Preserving Fruits or other Organic Substances; and we do hereby declare the following to be a full, clear, and exact description of the invention, such as will enable others skilled in the art to which it appertains to make and use the same.

Our invention has for its object to provide a method of preserving fruits and other organic substances or objects, particularly of the fruit, vegetable, grain, and analogous classes, wherein the removal or detachment of the object from the tree, vine, or stalk upon which it has grown does not check development.

A further object is to provide a suitable apparatus for carrying out this method.

In carrying out our invention we employ an air-tight receptacle, either a room, vault, or other storage-chamber—such as that of a freight-car, vessel, or portable container—and in the preliminary treatment we inject into this vessel a gaseous mixture composed mainly of from one-half to one per cent. of chlorine, ten to twelve per cent. of carbonic oxid, (CO,) eight to ten per cent. of carbonic acid, ($CO_2$,) and the remainder composed of hydrogen and nitrogen in variable proportions, the usual proportions being about one to five per cent. of hydrogen and seventy-five to seventy-nine per cent. of nitrogen. It will be understood, however, that the proportions of nitrogen and hydrogen may be varied within very large limits, as the active agents in this preliminary operation are the chlorine and carbonic oxid, (CO.) The apparatus is so arranged that when this gaseous mixture is blown into the air-tight receptacle the air contained therein will be driven out, so that the receptacle will contain practically nothing but the mixture of the gases specified above and the fruit or other articles to be treated, which have been first placed in the receptacle. This mixture is allowed to remain in the receptacle for about twenty-four hours, although in some cases twelve hours will be sufficient and in other cases the time must be extended to thirty-six hours, depending upon the nature of the articles under treatment. At the end of this time moisture will be deposited, and a further object of our invention is to cause a circulation of the mixture of gases above mentioned through that part of the apparatus which includes the air-tight receptacle and the apparatus for removing the moisture. This can generally be accomplished by causing the gaseous mixture to circulate through these parts of the apparatus for a period of ordinarily from twenty minutes to one hour, depending entirely upon the size of the air-tight receptacle or room and the amount of material under treatment. This drying process should be repeated from time to time whenever moisture appears in appreciable quantities in the room, which fact is to be determined by means of the apparatus which will hereinafter be described. The subsequent treatment consists in subjecting the articles alternately to the action of a gaseous mixture composed of nitrogen, carbonic acid, ($CO_2$,) and carbonic oxid, (CO,) and to the action of ordinary air to keep the fruit, &c., alive. This treatment with air should occur once in a period varying from three to thirty days, according to the kind of material treated.

The accompanying drawing is a side view, partly in section, of our complete apparatus.

A represents a furnace, the interior part of which, $a$, flares slightly from the top for convenience in charging and cleaning. Beneath the furnace is the usual ash-box $a'$. A swinging door $a^2$ is provided, which under ordinary conditions is closed. This door is hinged at one side, and at the other a cam $a^3$ is provided for holding the door tightly against an asbestos ring $a^4$, which is provided at the bottom of the furnace. At the top of the furnace is arranged a door $a^5$ of the ordinary construction, mounted upon a weighted lever $a^6$, operated in the usual way. Connected to the top of the furnace is a smokestack $a^7$, which is provided with an ordinary valve $a^8$.

B represents a blower, preferably a Root blower, provided with an inlet-pipe $b$ and an outlet-pipe $b'$. This pipe $b'$ is connected to a pipe $b^3$ and to another pipe $b^2$, which passes through the wall of the furnace and delivers into the bottom thereof. The pipe $b^2$ at its other end is connected with the lower part of a receptacle C, which is filled with excelsior, and into which salt water is introduced sufficient to keep the excelsior saturated. To the upper part of this receptacle is connected a pipe $c$, which connects with the pipe $b^2$ just before it enters the wall of the furnace. This pipe is provided with a valve $c^2$. The pipe $b^2$ is provided with two valves $b^4$ and $b^5$, so that the current of air may be sent either into the furnace or into the receptacle C.

To the top of the furnace is connected a pipe D, provided with a valve $d$ near the furnace, and which pipe is connected with the pipe $b^3$. This pipe D is connected to the bottom of a receptacle E, which is cylindrical in form and provided with sieves $e$, upon which is placed partially-slaked lime to remove any sulphureted hydrogen in the gas which is delivered to said receptacle. To the top of this receptacle E is connected a pipe $e^2$, which at the other end is connected to the bottom of a receptacle F, which is filled with dry lump lime in a caustic condition. To the top of this receptacle is connected a pipe $f^2$, the other end of which is connected to the bottom of a receptacle G, which is filled with a mixture of dry lump lime in a caustic condition, and lumps of anhydrous calcium chloride. The caustic lime in the receptacle F removes a part of the carbonic-acid gas ($CO_2$) and the lump lime, and the calcium chloride in the receptacle G removes the last traces of moisture.

To the top of the receptacle G is connected a pipe $g^2$, which at its other end is connected to the bottom of the receptacle H, which is filled with iron wool and ferric hydrate ($Fe_2H_6O_6$) to catch sulphur and sulphureted hydrogen. To the top of this receptacle is connected a pipe $h^2$, which is connected at its outer end to the bottom of an air-tight receptacle I, in which the articles to be treated are placed. This pipe is provided with a valve $h^3$.

The receptacles C, E, F, G, and H are provided with removable covers $c'$, $e'$, $f'$, $g'$, and $h'$, so that they may be conveniently emptied and recharged.

All the pipes used in the apparatus are provided with union-joints at convenient points—such as are shown, for instance, at $d^3$, $e^3$, $f^3$, and $g^3$—although they may be used in other places, if desired.

The receptacle I, at least in the form in which it appears when a large quantity of material is to be treated, consists of a room provided with air-tight walls, on the outside of which are cork slabs $i$ to keep the room at an even temperature. Of course it is to be understood that any other packing, either inside or outside the walls, may be used, if desired. This room is provided with a door $i'$, which is adapted to be fastened by wedges $i^2$ firmly against the wall of the receptacle, a rubber packing $i^9$ being used between the door and the wall. This room is further provided with a window $i^3$, through which the goods under treatment may be seen, just inside of which is located a thermometer $i^4$. Gages $i^5$ and $i^6$ are provided, which are connected to the room by tubes $i^7$, $i^8$, $i^9$, and $i^{10}$. Each of these tubes is provided with a valve, which are lettered in the drawings $i^{11}$, $i^{12}$, $i^{13}$, and $i^{14}$. The gages $i^5$ and $i^6$ are composed of glass and are provided with screw-caps $i^{15}$, $i^{16}$, $i^{17}$, and $i^{18}$ for convenience in charging and recharging. The gage $i^5$ is intended to be partially filled with lumps of white phosphorus, and when the valves $i^{11}$ and $i^{12}$ are open the phosphorus will smoke, when there is only a very small quantity of oxygen present, as low under certain conditions as one one-hundredth part of one per cent. This gage is for the purpose of determining whether there is any appreciable amount of oxygen present in the room. The gage $i^6$ is intended to be partially filled with lumps of calcium chloride for the purpose of determining whether there is any appreciable amount of moisture in the room. When the valves $i^{13}$ and $i^{14}$ are open, these lumps of calcium chloride will show beads of moisture upon them if there is any trace of moisture in the room. The room is also provided with a bib $i^{19}$, which is provided with a valve $i^{20}$. This bib is for the purpose of withdrawing a portion of the gaseous mixture from the room for the purpose of analysis, which is accomplished by fitting a rubber tube over the bib $i^{19}$ and drawing it off into a small gasometer.

To the top of the room is connected a pipe J, which at its other end is connected to the smoke-pipe $a^7$. A valve $j$ is provided close to the wall of the receptacle or room, and another valve $j'$ is provided close to the smoke-pipe. This pipe is also provided with a branch $b$, already described, which is connected with the blower B. This branch is provided with a valve $b^6$ and with a branch pipe $b^7$, which is provided with a valve $b^8$, the pipe $b^7$ being open to the air. The pipe $b^3$, which is connected to the pipe $b'$, leading from the blower B, is provided with a valve $b^9$, located in proximity to the pipe D. This pipe $b^3$ delivers into the pipe $h^2$, which is connected to the lower part of the room or receptacle I. This pipe is provided with a valve $b^{10}$, which is located in proximity to the point where the pipes $b^3$ and $h^2$ join. The pipe $b^3$ is also provided with a valve $b^{11}$, located beneath the pipe D.

The operation is as follows: The articles to be treated being placed in the room I and the door of the latter having been tightly closed, fire is started in the furnace A, which is filled with a good quality of coke or charcoal. The valves $b^4$, $b^6$, $b^{11}$, and $c^2$ are closed and the valves $b^8$ and $b^5$ are opened. The blower (driven by any suitable source of power, which is not shown) is then started and a blast of air driven into the lower part of the furnace A. The valve $d$ and the door $a^5$ at the top of the furnace are closed and the valve $a^8$ in the smoke-pipe is open, while the valve $j'$ in the pipe J is closed in order that there may be a free exit of the smoke, &c., to the chimney. After the fire is well started an additional supply of coke or charcoal is put into the furnace until it is well filled and the blast is continued until practically the whole mass is heated to redness. The valves $a^8$, $b^5$, and $b^{11}$ are closed and the valves $b^4$ and $c^2$ are opened and a blast of air from the blower then passes through the pipe $b^2$, through the receptacle C, where it is charged with water containing common salt or chlorid of sodium, and the air thus saturated passes through the pipe $c$ into the bottom of the furnace A, where it comes in contact with the red-hot coke and heated bricks. Decomposition at once takes place. The chloride of sodium is separated into its elements and the chlorine gas passes on, while the sodium is taken up by the bricks. The water is also separated into hydrogen and oxygen, the oxygen combining with the coke or charcoal to form carbonic oxid or carbonic-acid gas, while the hydrogen remains unchanged. In passing up through the heated coke a quantity of carbonic-acid gas is reduced, forming carbonic oxid, although a quantity of carbonic-acid gas ($CO_2$) is left. The mixture of nitrogen, hydrogen, carbonic oxide, (CO,) carbonic-acid gas, ($CO_2$,) and chlorine then passes through the pipe D, the valves $d$, $d^2$, $h^3$, $j$, and $j'$ being open and the valves $b^9$, $b^{10}$, and $b^{11}$ being closed. The gaseous mixture then passes through the receptacles E, F, G, and H, respectively, and into the room I, the air contained in said room at the same time passing out through the pipe J and through the smoke-pipe $a^7$ into the chimney. The partially-slaked lime in the receptacle E removes almost all the sulphur and sulphureted hydrogen. The lime in the receptacle F removes the larger part of the moisture and some of the carbonic-acid gas, ($CO_2$,) and the caustic lime and the calcium chloride in the receptacle G removes the last traces of moisture. The iron wool and ferric hydrate in the receptacle H removes the last traces of sulphur and sulphureted hydrogen. After this operation has been continued for fifteen minutes to half an hour, the time depending upon the size of the room, said room has become completely filled with the gaseous mixture already described. The valves $j$, $b^{10}$, and $h^3$ are then kept closed and the room allowed to remain undisturbed for a period varying from twelve to thirty-six hours, the usual period being about twenty-four hours. Care must be taken, especially when the room I is filled with juicy fruits and fluid, not to use a gaseous mixture containing too large a percentage of chlorine, as this would bleach the fruit, &c. After standing for about twenty-four hours an analysis of the gases in the room I will show, if juicy fruits or some other fluids are under treatment, that carbonic-acid gas ($CO_2$) and moisture have developed. The next step in the treatment is to remove these objectionable ingredients by circulating the gaseous mixture through the receptacles E, F, G, and H and the room I. This is effected as follows: The valves $j'$, $b^4$, $b^5$, $c^2$, $b^9$, $d$, $b^8$, and $b^{10}$ are closed and the valves $j$, $b^6$, $b^{11}$, $d^2$, and $h^3$ are opened. The blower B is then started, and the gaseous mixture flows from the room I through the pipes J and $b$, the blower B, the pipes $b'$ and D, the receptacles E, F, G and H, and their connecting-pipes $e^2$ $f^2$ $g^2$ $h^2$ into the room I. The caustic lime and the calcium chloride will remove all traces of moisture. This drying process should be done whenever an appreciable amount of moisture (ascertained by the use of the gage $i^6$ or by an observation of the window $i^3$ upon which the moisture is apt to be deposited) appears in the room I, until the articles under treatment give off very little moisture. The fruits or other articles under treatment are then subjected to the action of the second gaseous mixture, composed of nitrogen, carbonic oxid, and carbonic acid. This is obtained in the following way: The furnace is charged with coke or charcoal, and a blast of air blown through until the contents of the furnace are heated nearly to redness. The valves $b^6$, $b^4$, $c^2$, $a^8$, $b^9$, $b^{11}$, and $b^{10}$ are closed, and the valves $b^8$, $b^5$, $d$, $d^2$, $h^3$, $j$, and $j'$ are opened. By running the blower B air is drawn through the pipes $b^7$ and $b$ and passes through the pipes $b'$ $b^2$ through the furnace, thence through the pipe D, the receptacles E, F, G, and H, and pipes $e^2$, $f^2$, $g^2$, and $h^2$ into the room I, the gases already contained in said room being driven out by the incoming gases through the pipe J into the smoke-pipe $a^7$, and thence into the chimney. As soon as the room is filled with this second gaseous mixture, the valves $j$, $b^{10}$, and $h^3$ are closed, and the articles under treatment allowed to remain in the air-tight room I, subject to the gaseous mixture therein contained, from three to thirty days before treating the fruit or fluids to common air, which treatment gives them another chance to absorb oxygen, so as to keep alive the life principle in the fruits. By experiment we find the fruits so treated are better flavored and sweeter.

The treatment with air is effected in the following manner: The valves $j$, $j'$, $b^8$, $b^{11}$, $b^9$, and $b^{10}$ are opened, the valves $b^6$, $b^4$, $b^5$, $d$, $d^2$, and $h^3$ are closed, and the blower is then started. Air is then drawn in through the pipe $b^7$ and passes downwardly through the pipe $b$, through the blower B, and thence through the pipes $b'$, $b^3$, and $h^2$ into the room I, the gases contained in said room being driven by the incoming air out through the pipe J into the smoke-pipe $a^7$, and thence into the chimney. After the articles under treatment in the room I have been subjected to the action of air for some time, the room is again filled with the gaseous mixture, composed of nitrogen, carbonic oxid, and carbonic acid, and this alternate treatment, with the second gaseous mixture and with air, may be repeated as often as desired.

Having thus described our invention, what we claim, and desire to secure by Letters Patent of the United States, is—

1. In the process of preserving organic substances, the step of subjecting said substances to the action of a gaseous mixture composed of chlorine, carbonic oxid, carbonic acid, hydrogen and nitrogen, substantially as described.

2. In the process of preserving organic substances, the steps of subjecting said substances to the action of a gaseous mixture composed of chlorine, carbonic oxid, carbonic acid, hydrogen and nitrogen, and removing the deposited moisture, substantially as described.

3. In the process of preserving organic substances, the steps of subjecting said substances to the action of a gaseous mixture composed of chlorine, carbonic oxid, carbonic acid, hydrogen and nitrogen, removing the deposited moisture and subjecting said substances to the action of a gaseous mixture composed of nitrogen, carbonic oxid and carbonic acid, substantially as described.

4. The process of preserving organic substances, which consists in subjecting them to the action of a gaseous mixture composed of chlorine, carbonic oxid, carbonic acid, hydrogen and nitrogen, removing the deposited moisture from the gaseous mixture from time to time, subjecting said substances to the action of a gaseous mixture composed of nitrogen carbonic oxid and carbonic acid, and subjecting them to the action of ordinary atmospheric air, substantially as described.

5. In an apparatus for preserving organic substances the combination of a blower B, a furnace A provided with a smoke-pipe $a^7$, a receptacle C adapted to contain salt water, receptacles adapted to contain purifying agents, a closed room I, valved pipes connecting together the blower and receptacle for salt water, said receptacle and the furnace, said furnace and the receptacles adapted to contain purifying agents said receptacles and the closed room, and said room and the smoke-pipe, whereby a current may be caused, from the blower through the receptacle for salt water, the furnace, the receptacles for purifying agents, the closed room and into the smoke-pipe, thus making it possible to completely drive out the air from the closed room into the smoke-pipe and to replace it with a gaseous mixture composed of chlorine, carbonic oxid, carbonic acid, hydrogen and nitrogen, substantially as described.

6. In an apparatus for preserving organic substances the combination of a closed room I, pipes J and $b$, a blower B, pipes $b'$, D and $h^2$, all of said pipes being provided with valves, receptacles adapted to contain purifying agents and pipes connecting said receptacles together, substantially as described.

7. In an apparatus for preserving fruit, the combination of a closed room, a pipe J leading therefrom provided with valves $j$ and $j'$, a pipe $b$ provided with a valve $b^6$, a pipe $b^7$ provided with a valve $b^8$, a blower B, a pipe $b'$ connected to said blower, a pipe $b^3$ connected to the pipe $b'$, and a pipe $h^2$ connected to the pipe $b^3$ and passing into the room I, substantially as described.

8. An apparatus for preserving organic substances, comprising a furnace provided with a smoke-pipe, a blower, a receptacle adapted to contain salt water, receptacles adapted to contain purifying agents, a closed room, pipes connecting the blower with the atmosphere, with the closed room, with the furnace, with the receptacle for salt water and with the receptacles for purifying agents, pipes connecting the receptacle for salt water with the furnace, pipes connecting the furnace with the closed room and with the receptacles for purifying agents, a pipe connecting one of the receptacles for purifying agents to the closed room, a pipe connecting said room to the smoke-pipe, all of said pipes being provided with valves and pipes connecting the receptacles for purifying agents together, substantially as described.

In testimony whereof we affix our signatures in presence of two witnesses.

ALBERT L. LAWTON.
ARTHUR W. LAWTON.

Witnesses:
W. V. JOHNSON,
H. P. NORMAN.